(12) United States Patent
Galo

(10) Patent No.: US 6,756,102 B1
(45) Date of Patent: Jun. 29, 2004

(54) ADHESIVE TAPE HAVING SERIAL SEGMENTS WITH NON-ADHERENT GRIPPING ELEMENTS

(76) Inventor: Stanko Galo, 109 Grand Ave., Englewood, NJ (US) 07631

( * ) Notice: Subject to any disclaimer, the term of this patent is extended or adjusted under 35 U.S.C. 154(b) by 24 days.

(21) Appl. No.: 10/191,144

(22) Filed: Jul. 9, 2002

Related U.S. Application Data

(60) Provisional application No. 60/304,956, filed on Jul. 12, 2001.

(51) Int. Cl.[7] .................................................. B32B 3/10
(52) U.S. Cl. ..................... 428/43; 428/195.1; 428/194; 428/906
(58) Field of Search .......................... 428/43, 194, 195, 428/906, 202, 192; 427/208.6

(56) References Cited

U.S. PATENT DOCUMENTS

| | | | |
|---|---|---|---|
| 1,643,926 A | | 9/1927 | Dickson |
| 2,914,166 A | | 11/1959 | Bihler |
| 3,457,919 A | * | 7/1969 | Harbard .................. 427/208.6 |
| 3,470,590 A | | 10/1969 | Hoff |
| 4,276,371 A | | 6/1981 | Scott |
| 4,558,888 A | | 12/1985 | Hanson et al. |
| 4,562,102 A | | 12/1985 | Rabuse et al. |
| 4,650,706 A | | 3/1987 | Emmel, John J. |
| 4,851,064 A | | 7/1989 | Darbo |
| 5,213,565 A | | 5/1993 | Rollband |
| 5,310,402 A | | 5/1994 | Rollband |
| 5,370,916 A | | 12/1994 | Olsen |
| 5,763,038 A | | 6/1998 | Wood |
| 5,878,971 A | | 3/1999 | Minnema |
| 5,981,823 A | | 11/1999 | Turngren |
| 6,033,751 A | | 3/2000 | Kline |
| 6,127,014 A | | 10/2000 | McKay, Jr. |

FOREIGN PATENT DOCUMENTS

GB      2214464      9/1989

\* cited by examiner

*Primary Examiner*—Alexander S. Thomas
(74) *Attorney, Agent, or Firm*—Arthur Jacob

(57) ABSTRACT

An adhesive tape of indeterminate length is capable of separation into serial segments of finite length, with each segment including a gripping element established by a non-adhesive area contiguous with at least one terminal end of the segment and spaced from each side edge of the segment so as to assure secure adherence of the segment from end to end of the segment to a juxtaposed surface and to facilitate selected release of the terminal end from the juxtaposed surface.

12 Claims, 3 Drawing Sheets

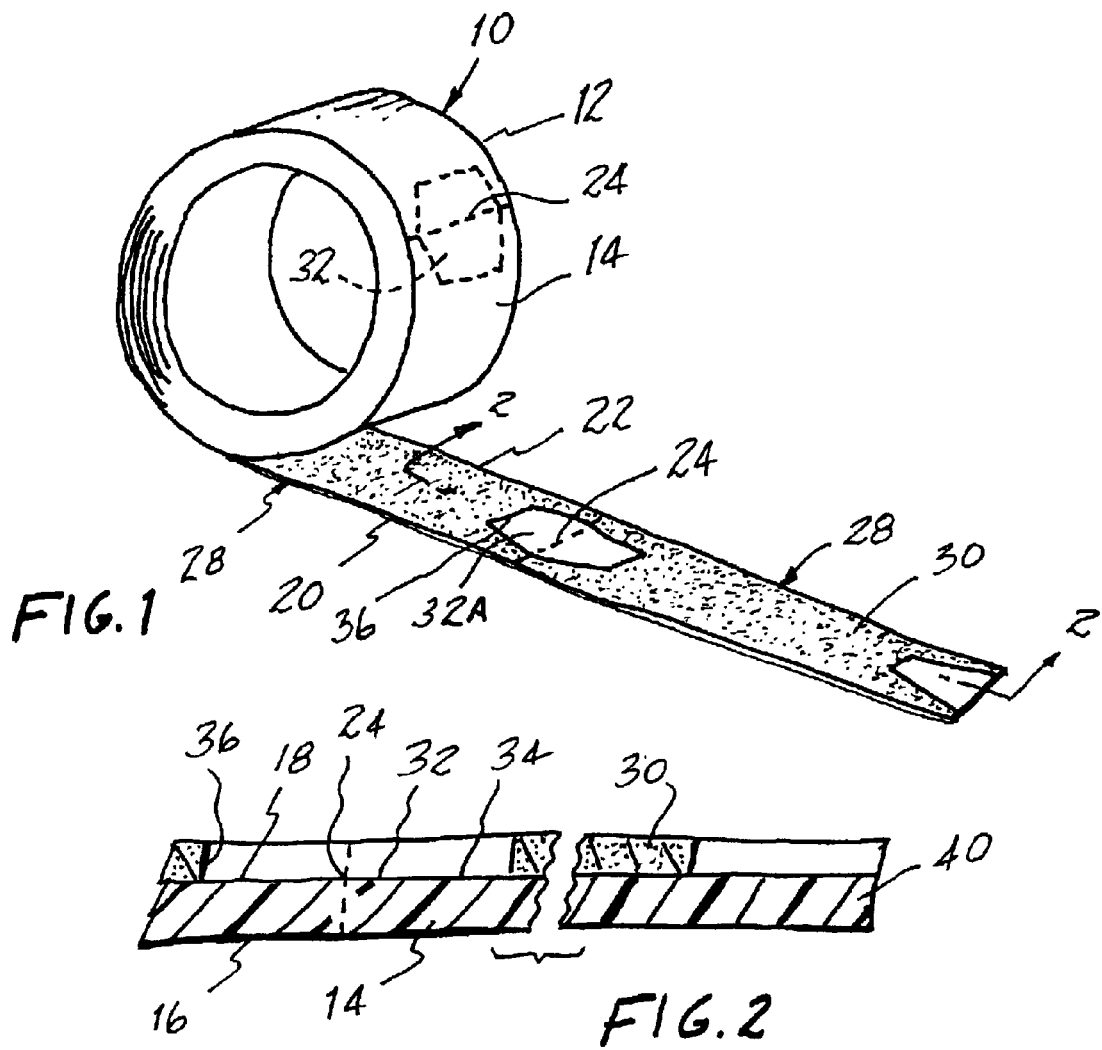
FIG. 1
FIG. 2
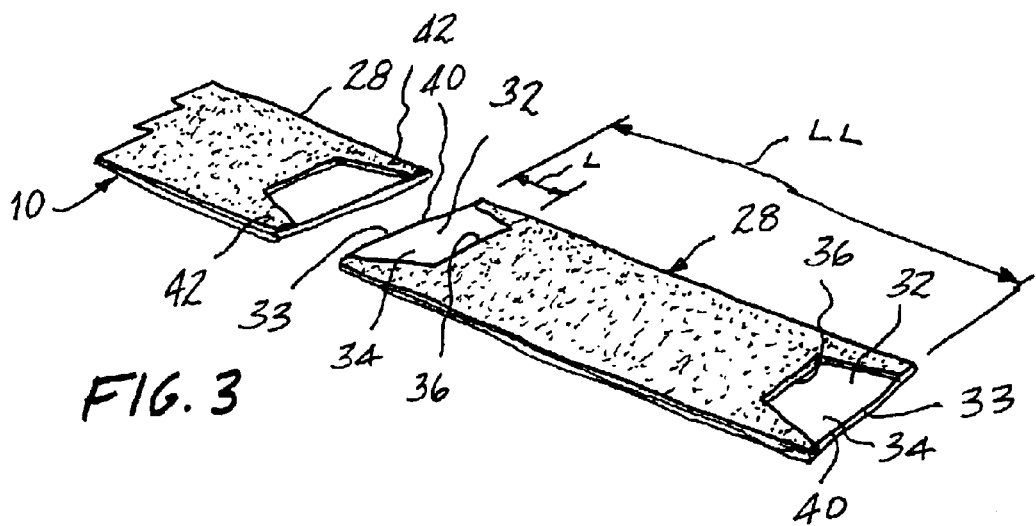
FIG. 3

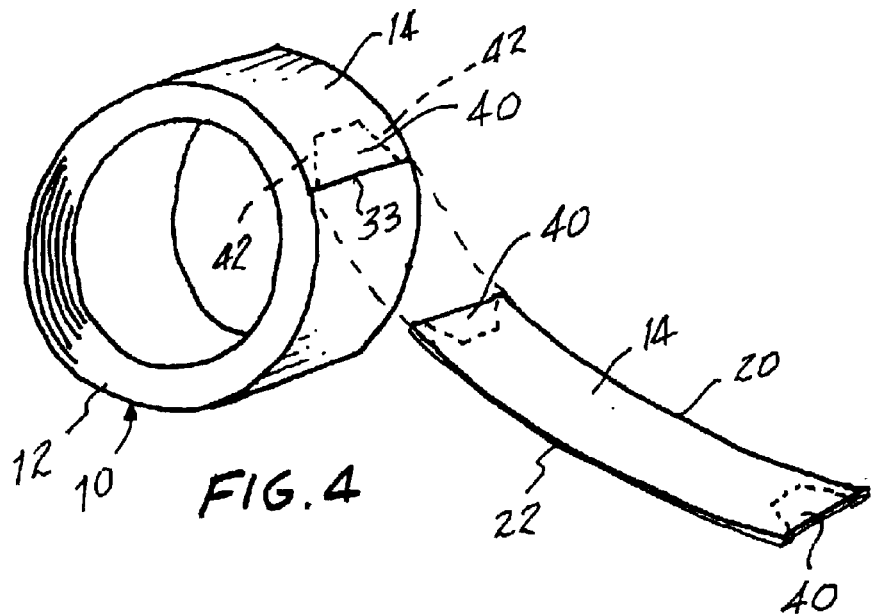
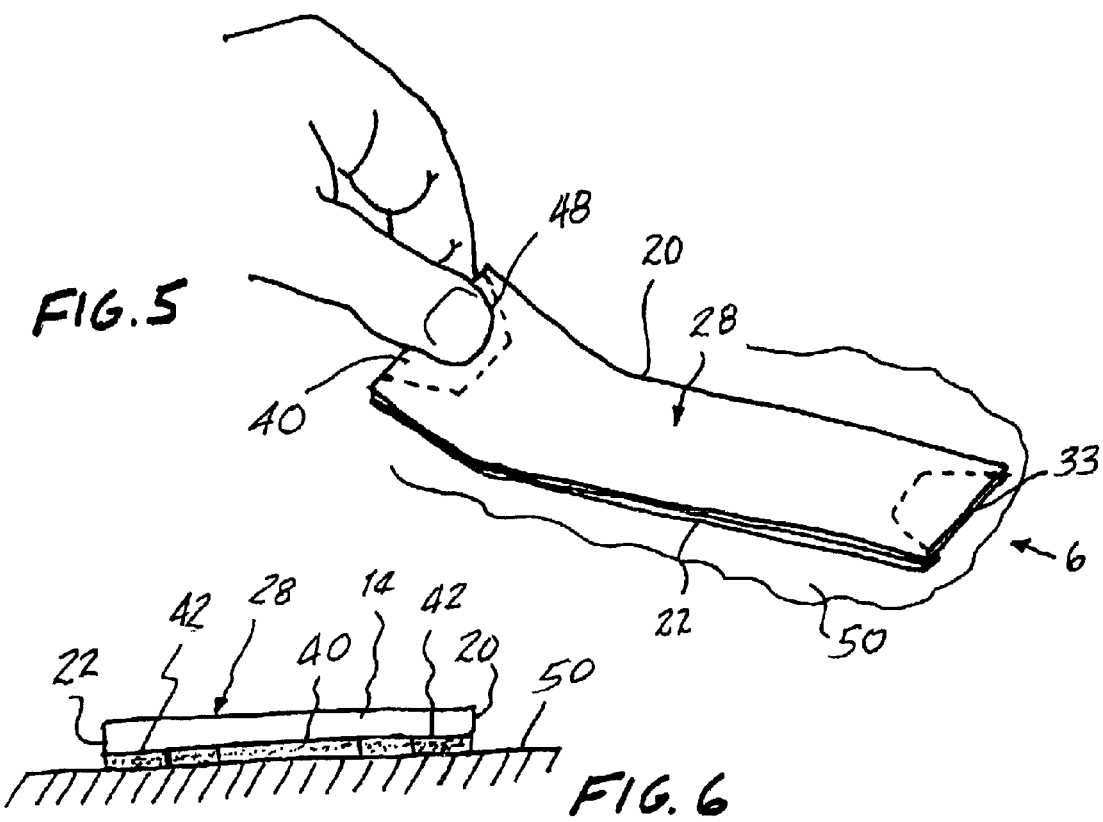

US 6,756,102 B1

ADHESIVE TAPE HAVING SERIAL SEGMENTS WITH NON-ADHERENT GRIPPING ELEMENTS

This application claims the benefit of provisional application serial No. 60/304,956, filed Jul. 12, 2001.

The present invention relates generally to adhesive tape construction and pertains, more specifically, to an adhesive tape of indeterminate length having serial segments of finite lengths capable of being separated and adhered selectively to a juxtaposed surface.

Adhesive tapes, and especially pressure-sensitive adhesive tapes, have found a myriad of uses and have become essentially staple items. Ordinarily, these tapes are supplied in indeterminate lengths, usually in the form of rolls of tape from which finite lengths are drawn and separated for use. Where it is desired to have available predetermined finite lengths, such rolls have been provided with longitudinally spaced apart perforations defining the desired predetermined finite lengths and enabling selective separation of the defined finite lengths for use. Separation of the finite lengths from the roll and manipulation of the separated lengths has been accomplished through the use of various supplemental non-adhesive tabs placed along the length of the tape.

The use of supplemental tabs requires additional manufacturing steps in introducing the tabs, additional space within the rolls of tape to accommodate the tabs, and either removal of the tabs upon use, and subsequent disposal, or some adjustment to the presence of a tab upon adhering a tabbed finite length to a juxtaposed surface.

Especially in those adhesive tapes to be applied to envelopes and packages, it becomes important to provide a tape length which can be applied easily and which includes no unadhered portion which can be snagged or which can otherwise impede the mechanized handling of such envelopes or packages.

The present invention provides an improvement which eliminates the necessity for supplemental tabs on finite-length segments of adhesive tape to be separated from a roll of tape of indeterminate length, and concomitant problems posed by such tabs, while facilitating both the separation and manipulation of the segments. As such, the present invention attains several objects and advantages, some of which are summarized as follows: Provides an adhesive tape which can be manufactured and supplied in an indeterminate length with serial segments separable readily for manipulation and secure adherence to a juxtaposed surface, without the need for supplemental tabs and the like; allows an adhesive tape of indeterminate length to be supplied in a roll from which finite-length segments readily are drawn, separated and manipulated through the use of a gripping element integrated with each segment; provides an elongate adhesive tape of indeterminate length with longitudinally spaced apart gripping elements integrated into the structure of the adhesive tape for ease of manufacture and ready manipulation of segments separated from the indeterminate length; facilitates the secure attachment of a segment of adhesive tape, separated from an indeterminate length of adhesive tape, to an envelope or package without appendages or other structure which could become snagged or which could otherwise interfere with the mechanized handling of the envelope or package; enables a choice in the length of an adhesive tape in increments related to the length of each consecutive serial tape segment; facilitates selective detachment and removal of a segment of adhesive tape from a juxtaposed surface to which the segment has been adhered; enables economical manufacture and supply of an elongate adhesive tape selectively separable into segments for secure attachment to a juxtaposed surface.

The above objects and advantages, as well as further objects and advantages, are attained by the present invention which may be described briefly as an adhesive tape including serial segments for being adhered individually to a juxtaposed surface, the adhesive tape comprising: an elongate substrate of indeterminate longitudinal length having altitudinally opposite faces and laterally opposite side edges; a plurality of end boundaries extending laterally across the substrate and spaced apart longitudinally for defining a corresponding plurality of serial segments of finite longitudinal length, each segment extending longitudinally between terminal ends defined by corresponding adjacent end boundaries; a layer of adhesive on each segment, the layer extending along one of the faces of the substrate and being contiguous with the adjacent end boundaries defining each segment; and a non-adhesive area extending along the one of the faces of the the non-adhesive area being contiguous with at least one of the adjacent end boundaries of each segment corresponding to the adjacent end boundaries, extending from the one of the adjacent end boundaries toward the other of the adjacent end boundaries, and having a limited longitudinal length substantially less than the longitudinal length of the corresponding segment, the non-adhesive area being located between the side edges and spaced laterally from each of the side edges to establish a non-adherent gripping element placed intermediate adherent portions located contiguous with the side edges for securing a corresponding terminal end to the juxtaposed surface upon adhesion of the corresponding segment to the juxtaposed surface, and for facilitating selected lifting of the corresponding terminal end altitudinally from the juxtaposed surface for selective release and removal of the corresponding segment from the juxtaposed surface.

In addition, the present invention includes an adhesive tape segment for adherence to a juxtaposed surface and selective detachment and removal from the juxtaposed surface, the adhesive tape segment comprising: an elongate substrate having a length extending longitudinally between terminal ends, altitudinally opposite faces and laterally opposite side edges; a layer of adhesive on the substrate, the layer extending along one of the faces of the substrate and being contiguous with the terminal ends; and a non-adhesive area extending along the one of the faces of the substrate, the non-adhesive area being contiguous with at least one of the terminal ends, extending from the one of the terminal ends toward the other of the terminal ends, and having a limited longitudinal length substantially less than the longitudinal length of the substrate, the non-adhesive area being located between the side edges and spaced laterally from each of the side edges to establish a non-adherent gripping element placed intermediate adherent portions located contiguous with the side edges for securing the one terminal end to the juxtaposed surface upon adhesion of the segment to the juxtaposed surface, and for facilitating selected lifting of the one terminal end altitudinally from the juxtaposed surface for selective release and removal of the segment from the juxtaposed surface.

The invention will be understood more fully, while still further objects and advantages will become apparent, in the following detailed description of preferred embodiments of the invention illustrated in the accompanying drawing, in which:

FIG. 1 is a pictorial view of a roll of adhesive tape constructed in accordance with the present invention;

FIG. 2 is an enlarged cross-sectional view taken along line 2—2 of FIG. 1;

FIG. 3 is a fragmentary perspective view of a portion of the adhesive tape and an adhesive tape segment severed therefrom;

FIG. 4 is a pictorial view of the roll of adhesive tape illustrating another aspect;

FIG. 5 is a fragmentary perspective view illustrating manipulation of an adhesive tape segment of the present invention;

FIG. 6 is an enlarged end view taken in the direction of arrow 6 in FIG. 5;

Figure 7:
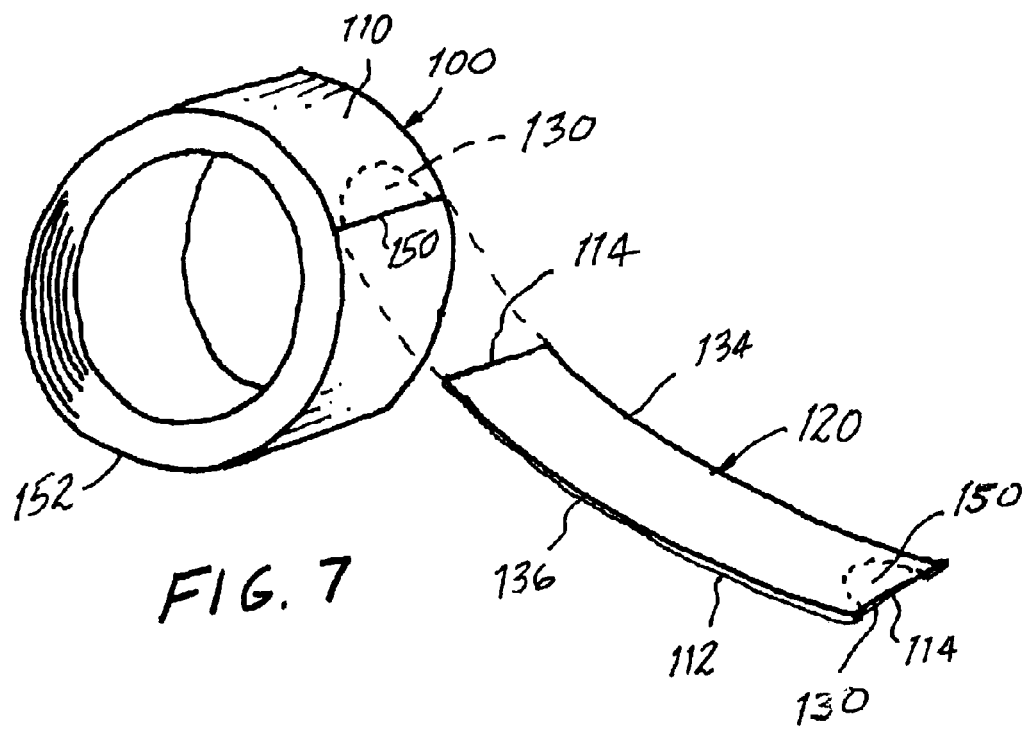
FIG. 7 is a pictorial view similar to FIG. 4 and illustrating another embodiment of the present invention.

Referring now to the drawing, and especially to FIGS. 1 and 2 thereof, an adhesive tape constructed in accordance with the present invention is shown at 10 and is seen to have an indeterminate length formed into a roll 12. Tape 10 includes an elongate substrate 14 of indeterminate longitudinal length having altitudinally opposite faces 16 and 18 and laterally opposite side edges 20 and 22. A plurality of end boundaries are shown in the form of perforations 24 extending laterally across the substrate 14, from side edge 20 to side edge 22, the perforations 24 being spaced apart longitudinally to define a corresponding plurality of serial segments 28 of finite longitudinal length between adjacent perforations 24.

A layer 30 of adhesive, preferably in the form of a pressure-sensitive adhesive, is provided along the face 18 of substrate 14, the adhesive layer 30 continuing longitudinally across each perforation 24 and along each segment 28. A non-adhesive area 32 extends along the face 18 and, in the present embodiment, straddles each perforation 24 so as to extend longitudinally into each segment 28. As best seen in FIG. 3, upon separating a segment 28 from the indeterminate length of tape 10, non-adhesive area 32 extends longitudinally along the separated segment 28 from one terminal end 33 of segment 28, established by one perforation 24, toward the other terminal end 33, established by the other perforation 24 of the adjacent perforations 24 defining the segment 28, the non-adhesive area 32 having a limited longitudinal length L substantially less than the longitudinal length LL of the segment 28. The non-adhesive area 32 is contiguous with the end of the segment 28, defined by perforation 24, is located between the side edges 20 and 22 and is spaced laterally from each of the side edges 20 and 22 so as to form a peninsula-like configuration jutting longitudinally into the segment 28 from the terminal end 33. In the illustrated embodiment, the non-adhesive area 32 is established by rendering corresponding surface portion 34 of the substrate 14 free of adhesive, layer 30 terminating at the boundary 36 of the non-adhesive area 32.

Turning now to FIGS. 4 and 5, the non-adhesive area 32 establishes a non-adherent gripping element 40. Thus, upon severing a segment 28 from the roll 12, as illustrated in FIG. 4, a gripping element 40 remains with the segment 28 still on the roll 12. The gripping element 40 is spaced from each side edge 20 and 22 so that adherent portions 42 of the adhesive layer 30 of the tape 10 extend all the way into contiguity with the severed terminal end 33 defined by the perforations 24 and thus maintain the tape 10 tightly secured in the roll 12. When it is desired to draw a segment 28 from the roll 12, a user merely lifts the substrate 14 of tape 10 at the gripping element 40, moving the substrate 14 altitudinally to release the adhesion between the adherent portions 42 and the juxtaposed surface of the substrate 14 and permit the drawing of another segment 28 from the roll 12.

As seen in FIGS. 5 and 6, the gripping elements 40 established in the freed segment 28 are available for grasping, as seen at 48, to manipulate that segment 28 and apply the freed segment 28 to a selected juxtaposed surface 50. Once applied to surface 50, the segment 28 is secured by the adhesive layer 40. The adherent portions 42, by virtue of the location between the gripping element 40 and each side edge 20 and 22, firmly secure each terminal end 33 of the segment 28 to the juxtaposed surface 50, thereby assuring that the segment 28 remains secured closely to the juxtaposed surface 50, from end to end, without any appendages which could become snagged or otherwise could interfere with an effective attachment of the segment 28 to the juxtaposed surface 50, or which could impede mechanical handling of any envelope or package to which the segment 28 is secured. Selected detachment and removal of the secured segment 28 from the juxtaposed surface 50 is facilitated by merely grasping the gripping element 40 and lifting the terminal end 33 of the segment 28 from the juxtaposed surface 50.

Moreover, where it is desired to dispense a length of adhesive tape from roll 12 longer than the length of one segment 28, a user need merely pull multiple lengths LL from the roll 12, with the segments 28 still integrated so that the drawn length is constructed in increments of length LL. In that instance, the non-adhesive areas 32 which lie intermediate the ends of the longer length adhesive tape each are surrounded completely by the adhesive layer 30, with each non-adhesive area 32 effectively becoming an island within the adhesive layer 30 of the longer adhesive tape, as illustrated at 32A in FIG. 1. Once the longer length adhesive tape is applied to a juxtaposed surface, these intermediate non-adhesive areas 32 are entirely isolated from the side edges 20 and 22 so that an essentially continuous seal is effected along the edges of the length of the longer adhesive tape. Thus, the provision of serial gripping elements 40 does not affect the ability to attain a desired secure seal along almost any incremental length selected for the longer adhesive tape.

Figure 8:
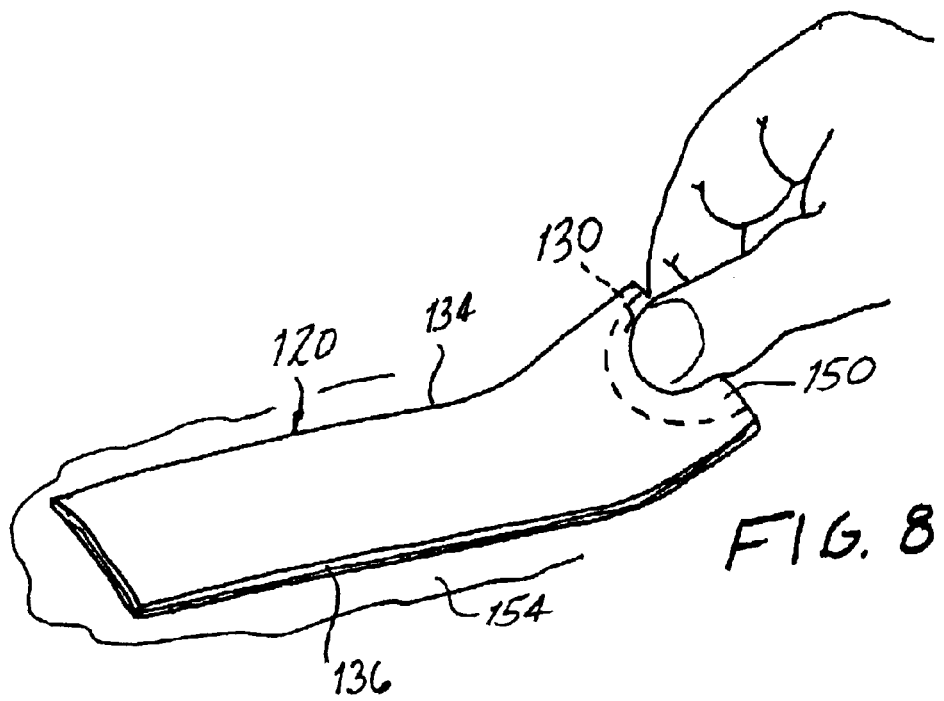
FIG. 8 is a perspective view of a severed tape segment of FIG. 7.

Referring now to FIGS. 7 and 8, another embodiment of the present invention is illustrated in the form of adhesive tape 100. Tape 100 is constructed in much the same manner as tape 10 in that a substrate 110 carries an adhesive layer 112 and includes end boundaries in the form of perforations establishing terminal ends 114 which delineate separable segments 120; however, unlike the construction of tape 10, non-adhesive areas 130 provided along tape 100 do not straddle the perforations. Instead, each non-adhesive area 130 is contiguous with a perforation and extends into only one of the segments 120 so that each segment 120 includes a non-adhesive area 130 located at only one end 114 of the segment 120. The non-adhesive area 130 is spaced from each side edge 134 and 136 so that the non-adhesive area 130 functions in the same manner as described above in connection with the embodiment of FIGS. 1 through 6, from the standpoint of providing a gripping element 150 for drawing a subsequent segment 120 from a roll 152, or for handling, manipulating and securing an already separated segment 120, or for selectively detaching and removing a segment 120 adhered to a juxtaposed surface 154.

It will be seen that the present invention attains all of the objects and advantages summarized above, namely: Provides an adhesive tape which can be manufactured and supplied in an indeterminate length with serial segments separable readily for manipulation and secure adherence to a juxtaposed surface, without the need for supplemental tabs and the like; allows an adhesive tape of indeterminate length to be supplied in a roll from which finite segments readily are drawn, separated and manipulated through the use of a gripping element integrated with each segment; provides an elongate adhesive tape of indeterminate length with longitudinally spaced apart gripping elements integrated into the structure of the adhesive tape for ease of manufacture and manipulation of segments separated from the indeterminate length; facilitates the secure attachment of a segment of adhesive tape, separated from an indeterminate length of adhesive tape, to an envelope or package without appendages or other structure which could become snagged or which could otherwise interfere with the mechanized handling of the envelope or package; enables a choice in the length of an adhesive tape in increments related to the length of each consecutive serial tape segment; facilitates selective detachment and removal of a segment of adhesive tape from a juxtaposed surface to which the segment has been adhered; enables economical manufacture and supply of an adhesive tape selectively separable into segments for secure attachment to a juxtaposed surface.

It is to be understood that the above detailed description of preferred embodiments of the invention is provided by way of example only. Various details of design and construction may be modified without departing from the true spirit and scope of the invention, as set forth in the appended claims.

The embodiments of the invention in which an exclusive property or privilege is claimed are defined as follows:

1. An adhesive tape including serial segments for being adhered individually to a juxtaposed surface, the adhesive tape comprising:
   an elongate substrate of indeterminate longitudinal length having altitudinally opposite faces and laterally opposite side edges;
   a plurality of end boundaries extending laterally across the substrate and spaced apart longitudinally for defining a corresponding plurality of serial segments of finite longitudinal length, each segment extending longitudinally between terminal ends defined by corresponding adjacent end boundaries;
   a layer of adhesive on each segment, the layer extending along one of the faces of the substrate and being contiguous with the adjacent end boundaries defining each segment; and
   a non-adhesive area extending along the one of the faces of the substrate, the non-adhesive area being contiguous with at least one of the adjacent end boundaries of each segment corresponding to the adjacent end boundaries, extending from the one of the adjacent end boundaries toward the other of the adjacent end boundaries, and having a limited longitudinal length substantially less than the longitudinal length of the corresponding segment, the non-adhesive area being located between the side edges and spaced laterally from each of the side edges to establish a non-adherent gripping element placed intermediate adherent portions located contiguous with the side edges for securing a corresponding terminal end to the juxtaposed surface upon adhesion of the corresponding segment to the juxtaposed surface, and for facilitating selected lifting of the corresponding terminal end altitudinally from the juxtaposed surface for selective release and removal of the corresponding segment from the juxtaposed surface;
   each end boundary comprising perforations extending from one of the side edges to the other of the side edges.

2. The adhesive tape of claim 1 wherein the adhesive comprises a pressure-sensitive adhesive.

3. The adhesive tape of claim 1 including a non-adhesive area contiguous with each of the end boundaries.

4. The adhesive tape of claim 3 wherein the adhesive comprises a pressure-sensitive adhesive.

5. An adhesive tape segment for adherence to a juxtaposed surface and selective detachment and removal from the juxtaposed surface, the adhesive tape segment comprising:
   an elongate substrate having a length extending longitudinally between terminal ends, altitudinally opposite faces and laterally opposite side edges;
   a layer of adhesive on the substrate, the layer extending longitudinally and laterally along one of the faces of the substrate and being contiguous with the opposite side edges for closely securing the opposite side edges to a juxtaposed surface, and contiguous with the terminal ends; and
   a non-adhesive area extending along the one of the faces of the substrate, the non-adhesive area being contiguous with at least one of the terminal ends, extending from the one of the terminal ends toward the other of the terminal ends, and having a limited longitudinal length substantially less than the longitudinal length of the substrate, the non-adhesive area being located between the side edges and spaced laterally from each of the side edges to establish a non-adherent manual gripping element placed intermediate adherent portions located contiguous with the one terminal end for closely securing the one terminal end to the juxtaposed surface upon adhesion of the adhesive tape segment to the juxtaposed surface, the gripping element having a lateral and longitudinal extent sufficient to facilitate selective manual gripping and lifting of the one terminal end altitudinally from the juxtaposed surface for selective release and removal of the adhesive tape segment from the juxtaposed surface.

6. The adhesive tape segment of claim 5 wherein the adhesive comprises a pressure-sensitive adhesive.

7. The adhesive tape segment of claim 5 including a non-adhesive area contiguous with each of the terminal ends.

8. The adhesive tape segment of claim 7 wherein the adhesive comprises a pressure-sensitive adhesive.

9. An adhesive tape of indeterminate longitudinal length for providing adhesive tape segments to be adhered individually to a juxtaposed surface, the adhesive tape segments each having a predetermined longitudinal length between terminal ends, the adhesive tape comprising;
   an elongate substrate of indeterminate longitudinal length having altitudinally opposite faces and laterally opposite side edges;
   a layer of adhesive extending longitudinally and laterally along one of the faces of the substrate and being contiguous with the opposite side edges for closely securing the opposite side edges to a juxtaposed surface; and
   a plurality of non-adhesive areas placed along the one of the faces of the substrate, with adjacent non-adhesive areas being spaced apart by a longitudinal distance corresponding to the predetermined longitudinal length of a corresponding adhesive tape segment and having a limited longitudinal length substantially less than the predetermined longitudinal length of the corresponding adhesive tape segment such that upon severing of an adhesive tape segment from the adhesive tape a non-adhesive area will be placed at a corresponding terminal end of the severed adhesive tape segment, each non-adhesive area being located between the opposite side edges of the substrate and spaced laterally from each of the side edges to establish a non-adherent manual gripping element placed intermediate adherent portions located contiguous with the corresponding terminal end for closely securing the corresponding terminal end of the severed adhesive tape segment to the juxtaposed surface upon adhering the severed adhesive tape segment to the juxtaposed surface, the manual gripping element having a lateral and longitudinal extent sufficient to facilitate selected manual gripping and lifting of the corresponding terminal end altitudinally from the juxtaposed surface for selective manual release and removal of the severed adhesive tape segment from the juxtaposed surface.

10. The adhesive tape of claim 9 wherein the adhesive comprises a pressure-sensitive adhesive.

11. The adhesive tape of claim 9 wherein the non-adhesive areas are located along the longitudinal length of the substrate such that a non-adherent manual gripping element will be established contiguous with each of the terminal ends of the severed adhesive tape segment.

12. The adhesive tape of claim 11 wherein the adhesive comprises a pressure-sensitive adhesive.

* * * * *